H. LEITNER AND W. H. EXLEY.
MANUFACTURE OF ELECTRIC ACCUMULATORS.
APPLICATION FILED APR. 15, 1919.
1,329,125.
Patented Jan. 27, 1920.
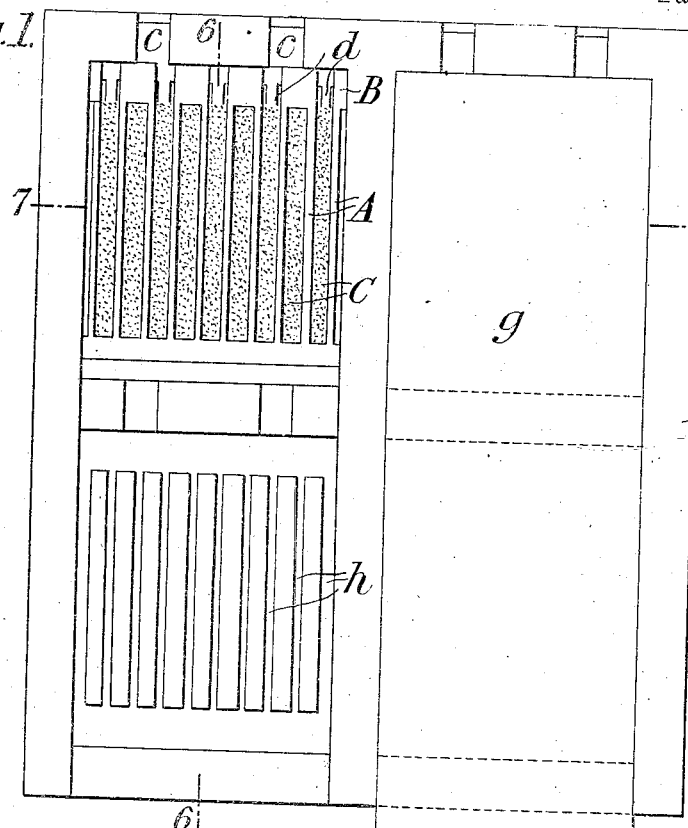
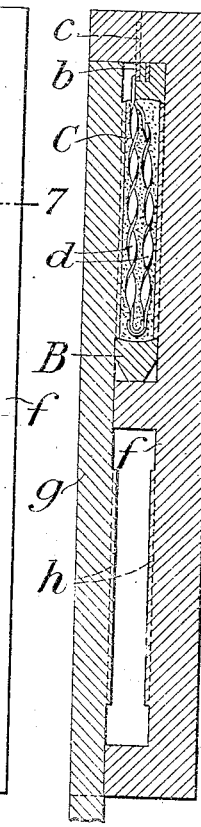
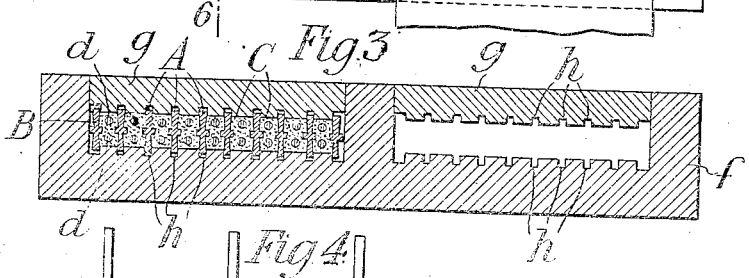
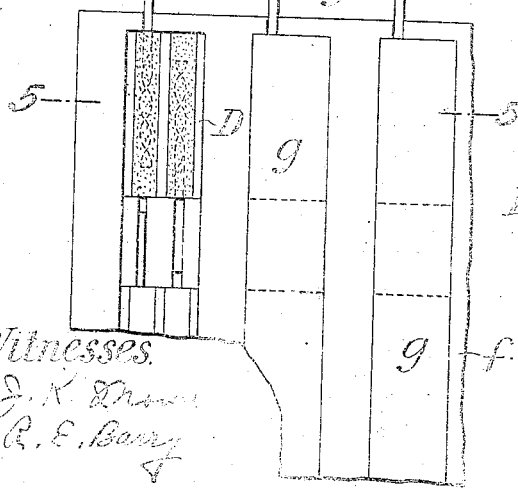
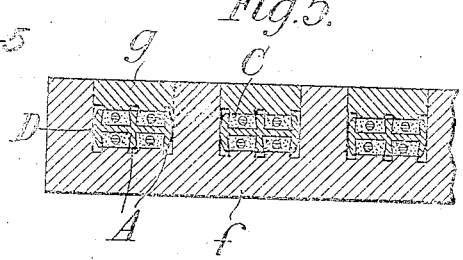

UNITED STATES PATENT OFFICE.

HENRY LEITNER, OF LONDON, AND WILLIAM HERBERT EXLEY, OF PONTEFRACT, ENGLAND.

MANUFACTURE OF ELECTRIC ACCUMULATORS.

1,329,125.          Specification of Letters Patent.     Patented Jan. 27, 1920.

Application filed April 15, 1919. Serial No. 290,361.

*To all whom it may concern:*

Be it known that we, HENRY LEITNER, a subject of the King of Great Britain, residing at 3 Victoria street, Westminster, London, England, and WILLIAM HERBERT EXLEY, a subject of the King of Great Britain, residing at "Ivyome," Mayor's Walk, Pontefract, Yorkshire, England, have invented new and useful Improvements in the Manufacture of Electrical Accumulators, of which the following is a specification.

Our invention relates to the manufacture of electric accumulators, particularly those of the lead sulfuric acid bi-polar type, the object of our invention being to produce such accumulators more economically and expeditiously than heretofore.

To facilitate the pressing of the active material into the frame or support and around the streamers after "pasting" we employ a mold or jig formed in two parts and provided with a series of grooves for receiving the edges of the bars of the support so that the portions of the said mold or jig between the grooves will press upon the paste to compress it in the desired manner.

Our invention will be readily understood by reference to the accompanying drawings, in which:—

Figure 1 is a view of part of the mold or jig for applying pressure to the paste, and Figs. 2 and 3 are sections on the lines 6—6, and 7—7 respectively of Fig. 1, the two parts of the jig being in position.

Fig. 4 is a view similar to Fig. 1 illustrating the application of the jig for the manufacture of torch accumulators.

Fig. 5 is a section taken on line 5—5 of Fig. 4, with the cover removed from the first compartment.

The mold or jig for compressing the active material is in the form of a box $f$ advantageously formed with a series of compartments, say four, as shown in Figs. 1 to 3 for pressing several elements simultaneously. This box is provided with covers $g$ designed to fit into the box so that they will always be properly positioned with regard to the latter. Each compartment and also its cover, has a series of grooves $h, h$ formed in it to receive the edges of the bars A of the support B, one of which is shown in position, and to form a series of ribs or pressing surfaces $i, i$ which enter between the said bars to press against the active material or paste C. Spaces $k, k$ are provided at the ends of the grooves for receiving the top and bottom bars of the supports B and other recesses $l, l$ are provided for the lugs $c, c$ of the lead members.

It will be understood that when the supports B filled with the paste C, leveled off to the surfaces of the support bars A, are placed in this mold or jig and pressure is applied the pressing surfaces $i, i$ will enter between the said bars A and compress the paste behind the faces of the said bars so that, when a series of elements are assembled in contact, spaces will be formed for the electrolyte of the battery.

In practice the cover of the mold is preferably made of such thickness that when placed in a press its surface will be flush with the top of the box when the desired pressure has been applied. It is also advantageously provided with a handle at one end (broken away in Figs. 1 and 2) for facilitating manipulation. Further the grooved bottom portion of the jig may be similar to the top portion and also advantageously provided with a handle to facilitate the removal of the pressed elements.

The compressing device can also be used as shown in Figs. 4 and 5 for compressing active material into small supports for accumulator cells for torches, when generally the compression of the active material much below the surface of the support is not necessary.

Having now particularly described and ascertained the nature of our said invention and in what manner the same is to be performed, we declare that what we claim is:—

1. A mold for compressing active material into a support and around the lead members of an electric accumulator plate comprising a body provided on one side with a chamber adapted to receive an accumulator plate having oppositely extending supporting ribs with active material located between the same, a series of spaced ridges extending upwardly from the bottom of the chamber adapted to engage the active material on one side of the plate between the ribs on that side of the plate, and a cover for said body having downwardly extending spaced ridges adapted to engage the active material on the other side of the plate between the ribs on that side of the plate, the spaces between the ridges being unobstructed to permit the ridges to compress the active material, when the cover is moved toward the body, without being interfered with by the ribs of the plate.

2. A mold for compressing active material into a support and around the lead members of an electric accumulator comprising a body provided on one side with a chamber adapted to receive an accumulator plate having oppositely extending supporting ribs which project beyond the active material located between the same, a series of spaced ridges extending upwardly from the bottom of the chamber adapted to engage the active material on one side of the accumulator plate between the ribs on that side of the accumulator plate, and a cover for said body having downwardly extending spaced ridges adapted to engage the active material on the other side of the accumulator plate between the ribs on that side of the accumulator plate, said ridges being of greater depth than the parts of the ribs which project beyond the active material to permit the ridges to compress said active material when the cover is moved toward the body.

HENRY LEITNER.
WILLIAM HERBERT EXLEY.